(12) United States Patent
Yang (10) Patent No.: US 11,370,396 B2
(45) Date of Patent: Jun. 28, 2022

(54) AUTOMOBILE HAVING STEAM CLEANER MOUNTED THERETO

(71) Applicant: Young Je Yang, Gimpo-si (KR)

(72) Inventor: Young Je Yang, Gimpo-si (KR)

( * ) Notice: Subject to any disclaimer, the term of this patent is extended or adjusted under 35 U.S.C. 154(b) by 118 days.

(21) Appl. No.: 16/978,053

(22) PCT Filed: Nov. 22, 2018

(86) PCT No.: PCT/KR2018/014406
§ 371 (c)(1),
(2) Date: Sep. 3, 2020

(87) PCT Pub. No.: WO2019/177225
PCT Pub. Date: Sep. 19, 2019

(65) Prior Publication Data
US 2021/0016748 A1 Jan. 21, 2021

(30) Foreign Application Priority Data
Mar. 14, 2018 (KR) ........................ 10-2018-0029735

(51) Int. Cl.
*B60S 1/64* (2006.01)
*B60S 1/66* (2006.01)
*B60S 3/04* (2006.01)

(52) U.S. Cl.
CPC . *B60S 1/64* (2013.01); *B60S 1/66* (2013.01); *B60S 3/04* (2013.01); *B60S 3/044* (2013.01)

(58) Field of Classification Search
CPC .... B60S 3/04; B60S 3/044; B60S 1/64; B60S 1/62; B08B 3/106

USPC .......................................................... 15/320
See application file for complete search history.

(56) References Cited

U.S. PATENT DOCUMENTS

2010/0231173 A1* 9/2010 Andrea ..................... H02J 7/02
320/137

FOREIGN PATENT DOCUMENTS

| JP | 2015032370 A | * | 2/2015 |
|---|---|---|---|
| JP | 2016215900 A | * | 12/2016 |
| KR | 20-0282504 Y1 | | 7/2002 |
| KR | 20-0322975 Y1 | | 8/2003 |
| KR | 20-0423459 Y1 | | 8/2006 |
| KR | 20-0429109 Y1 | | 10/2006 |
| KR | 10-2011-0107629 A | | 10/2011 |

OTHER PUBLICATIONS

International Search Report dated May 31, 2019 corresponding to International Application No. PCT/KR2018/014406.

* cited by examiner

*Primary Examiner* — Katina N. Henson
(74) *Attorney, Agent, or Firm* — Hauptman Ham, LLP (57) ABSTRACT

The present disclosure relates to an automobile including a steam washer mounted thereon capable of removing water remaining in the steam washer within a short period of time through the use of an air compressing tank and a compressed air feeding pump for feeding compressed air stored in the air compressing tank to a water chamber of a steam generator and a water tank.

4 Claims, 7 Drawing Sheets

AUTOMOBILE HAVING STEAM CLEANER MOUNTED THERETO

CROSS-REFERENCE TO RELATED APPLICATION

This application is a US National Stage of International Application No. PCT/KR2018/014406, filed on Nov. 22, 2018, which is based upon and claims the benefit of priority to Patent Application No. 10-2018-0029735, filed on Mar. 14, 2018 in Korea. All of the aforementioned applications are hereby incorporated by reference herein in their entireties.

TECHNICAL FIELD

Exemplary embodiments according to the present disclosure relate to an automobile including a steam washer mounted thereon, and more particularly, to an automobile including a steam washer mounted thereon capable of thoroughly and quickly washing the automobile by heating a relatively small amount of water to generate a high-temperature, high-pressure steam used for washing the automobile.

BACKGROUND ART

In general, washing an automobile involves the generation of a large amount of waste water or the use of a large amount of water; hence the need for expensive, large-scale waste water facilities. In order to solve such problem, Korean Utility Model Publication No. 20-0322975 (hereinafter, referred to as "Related Art Document") discloses a built-in steam washer for an automobile. The Related Art Document discloses a technology for mounting a motor pump including a 12 V DC motor, instead of a motor for a water supply pump for a largest power consumption, so that the motor is operated by the sole use of a battery charged by a built-in charger, and a small-capacity inverter to operate at AC 220 VFH only the burner of the combustor that requires low power.

However, the built-in steam washer for an automobile according to the Related Art Document does not provide a solution to the damage or malfunction of the device that may occur due to the freezing of water fed to the steam washer as a steam source during the winter season.

DISCLOSURE OF INVENTION

Problem to be Solved by the Invention

The present disclosure has been conceived under the circumstances set forth above and provides an automobile including a steam washer mounted thereon that prevents the damage or malfunction of the device due to bursting by freezing during the winter season.

The present disclosure seeks to stably supply operating power to an automobile including a steam washer mounted thereon.

The present disclosure enables an administrator to remotely monitor an operating status of a steam washer mounted in an automobile.

Means for Solving Problem

In order to achieve the aforementioned objectives, an automobile including a steam washer mounted thereon, the automobile includes:

an automobile battery charged by a voltage generated from a generator operated by an automobile engine;

a battery package mounted on the automobile for high-voltage charging and discharging;

a charging device including a charger for charging the battery package by using power being supplied and a charging controller for controlling the charging of the charger;

The automobile includes a first inverter to convert a direct current (DC) voltage outputted from the battery package to an alternating current (AC) voltage;

a steam washer operated by the AC voltage outputted from the first inverter, the steam washer including: a combustion chamber including a water chamber and a combustion chamber including a combustor for heating the water stored in the water chamber; a steam generator including a steam discharger for discharging the steam heated by the combustor; a water tank for storing water fed into the steam generator; and a body including the water tank and the steam generator; and a heating unit provided in the body of the steam washer and operated by the AC voltage outputted from the first inverter.

The automobile includes a current limiting device including a high temperature shut-off switch to cut off the voltage fed from the first inverter to the heating unit in the case in which the heat generated from the heating unit rises above a predetermined range of transition temperature, and to feed the voltage from the first inverter to the heating unit in the case in which the heat generated from the heating unit decreases below the predetermined range of transition temperature.

The automobile includes: an air compressing tank for discharging, outwardly by an air pressure, the water stored in the water chamber of the steam generator and a compressed air feeding pump for feeding the compressed air stored in the air compressing tank to the water chamber of the steam generator and the water tank; and a frame including an accommodation space for accommodating the steam washer, a support for supporting the air compressing tank and the compressed air feeding pump to be mounted on the accommodation space, and a hanger for hanging and securing a steam spray nozzle connected to the steam generator.

According to exemplary embodiments of the present disclosure, the charger of the charging device further includes:

a second inverter to convert the voltage received from the automobile battery to 220 V AC; and a DC converter to convert the 220 V AC outputted from the second inverter to a DC power for charging the battery package.

According to exemplary embodiments of the present disclosure, the charger of the charging device further includes:

a transformer to convert the 110 V AC or 220 V AC to multiple levels of decreased AC voltages and output the voltages; and an output voltage automatic selection unit including and an electronic contactor mounted on output lines to control ON/OFF based on an output control signal, wherein the converted multiple voltages (6 V, 12 V, 24 V) are outputted through the output lines differently based on an operation of the transformer, respectively.

According to exemplary embodiments of the present disclosure, the automobile further includes:

an environment sensor to detect information on an interior environment of the automobile including the steam washer mounted thereon;

a wireless communication unit to transmit and receive data on an interior temperature of the steam washer to and from the environment sensor; and a detected information processor to transmit the detected environment information inputted from the environment sensor to an external device via the wireless communication unit.

Effect of the Invention

According one or more exemplary embodiments of the present disclosure, an automobile including a steam washer mounted thereon employs an air compressing tank, and a compressed air feeding pump for feeding compressed air stored in the air compressing tank to a water chamber of a steam generator and to a water tank, such that the water remaining in the interior of the steam washer is removed within a relatively short period of time. Moreover, the automobile including the steam washer mounted thereon includes a heating unit operated by an alternating current (AC) voltage outputted from a first inverter, thereby preventing the damage or malfunction of the device in the automobile that may occur due to freezing during the winter season.

Furthermore, the automobile including the steam washer mounted thereon according to one or more exemplary embodiments of the present disclosure maintains the interior of the automobile to be warm when not in operation by virtue of the heating unit for maintaining high temperature for 10 hours or more using only a few minutes of power supply.

BRIEF DESCRIPTION OF DRAWINGS

Although exemplary embodiments of the present disclosure have been shown and described with reference to the accompanied drawings, the present invention is not limited to the described embodiments. Instead, it would be appreciated by one of ordinary skill in the art that changes may be made to these embodiments without departing from the principles and spirit of the invention, the scope of which is defined by the claims and their equivalents.

BEST MODE(S) FOR CARRYING OUT THE INVENTION

Advantages and features of the present invention and methods for achieving them will be made clear from exemplary embodiments described below in detail with reference to the accompanying drawings. The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, exemplary embodiments of the present disclosure will be described in detail with reference to the accompanied drawings.

Figure 1:
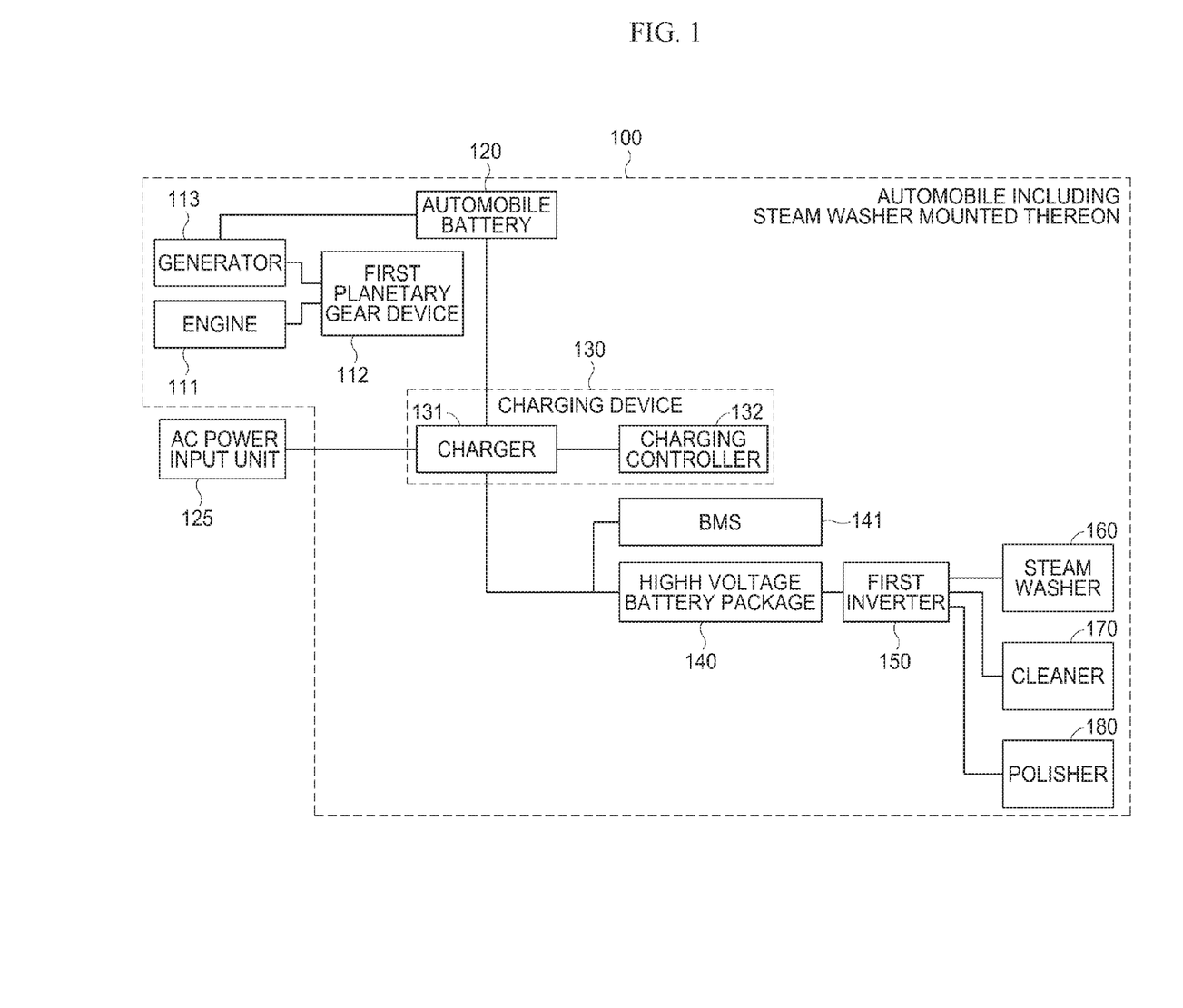
FIG. 1 is a block diagram illustrating an overall structure of an automobile including a steam washer mounted thereon according to an exemplary embodiment of the present disclosure.
Figure 2:
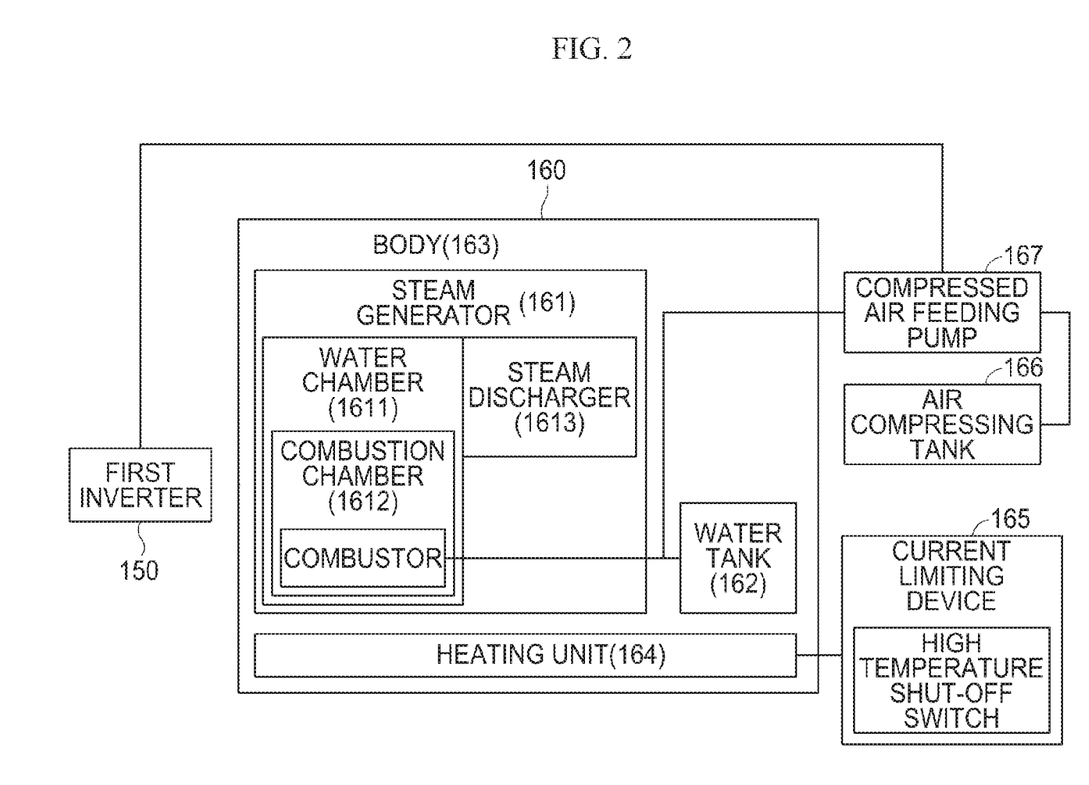
FIG. 2 is a block diagram illustrating an overall structure of the steam washer according to an exemplary embodiment of the present disclosure.

FIG. 1 is a block diagram illustrating an overall structure of an automobile including a steam washer mounted thereon according to an exemplary embodiment of the present disclosure. FIG. 2 is a block diagram illustrating an overall structure of the steam washer according to an exemplary embodiment of the present disclosure.

As shown in FIG. 1, the automobile including the steam washer mounted thereon according to an exemplary embodiment of the present disclosure includes an automobile battery (120), an alternating current (AC) power input unit (125), a charging device (130), a high-voltage battery package (140), a battery management system (BMS, 141), a first inverter (150), a steam washer (160), a cleaner (170) and a polisher (180).

Referring to FIG. 1, a first planetary gear device (112) includes an automobile engine (111) to generate power to a rotating element and a generator (113) with reference to FIG. 1. The first planetary gear device (112) may include a sun gear coupled to the automobile engine (111) to generate power to a rotating element, a carrier coupled to the generator (113), and a ring gear coupled to a brake.

The automobile battery (120) is charged by a voltage generated from the generator (113) operated by the automobile engine (111). By way of example, the automobile battery (120) may include a 12 V battery.

The AC power input unit (125) may be provided in a power supply device that receives an input of, for example, 110 V AC or 220 V AC of household power. The charging device (130) includes a charger (131) to charge the battery package (140) by using power being supplied and a charging controller (132) to control the charging of the charger (131).

A detailed description of the charging device (130) will be provided below with reference to the accompanied drawings.

The battery package (140) is configured to charge by receiving a high voltage from the charger (131), and supply operation power to the steam washer (160), the cleaner (170) or the polisher (180). The battery package (140) is provided by stacking battery modules comprised of a plurality of battery cells, and may include a lithium ion battery of high voltage of 240 to 450 V DC.

The battery management system (BMS, 141) is configured to transmit and receive control information by communicating with the charging device (130) and/or the high-voltage battery package (140), and monitor a status of the high-voltage battery package (140).

The first inverter (150) is configured to convert a direct current (DC) voltage outputted from the high-voltage battery package (140) to an AD voltage. The DV voltage outputted from the high-voltage battery package (140) is supplied to the steam washer (160), the cleaner (170), the polisher (180), an air-conditioner, or a heater. The first inverter (150) may include a power sensor mounted thereon to detect an amount of AC voltage being outputted.

Referring to FIG. 2, the steam washer (160) is operated by the AC voltage outputted from the first inverter (150), and includes a steam generator (161), a water tank (162), a body (163), a heating unit (164), a current limiting device (165), an air compressing tank (166) and a compressed air feeding pump (167).

The steam generator (161) includes a water chamber (1611) to store water fed from the water tank (162), a combustion chamber (1612) including a combustor mounted thereon to heat the water stored in the water chamber (1611), and a steam discharger (1613) to discharge steam heated by the combustor. The steam generator (161) may include a pressure sensor to detect pressure of the water chamber (1611) and a temperature sensor to measure temperature.

The water tank (162) is configured to supply a steam source of the steam generator (161) and store water free of any detrimental materials so as not to contaminate the surroundings during steam washing, for example, water works, or tap water. Between the water tank (162) and the water chamber (1611) of the steam generator (161), a water supply pipe and an on-off switch to control an operation of a damper to regulate a flow of water within the water supply pipe are provided.

The body (163) includes the steam generator (161) and the water tank (162) built inside to be protected therein. The body (163) may include a water inlet and a combustion source inlet outwardly thereof, wherein a combustion source is injected through the combustion source inlet.

The heating unit (164) is provided in the body (163) of the steam washer (160), and is operated by the AC voltage outputted from the first inverter (150). By way of example, the heating unit (164) may include a heating layer provided in a base member. The base member may include a metallic material such as aluminum, or a heat-resistant plastic material, such as polysulfone (PSU), polyethersulfone (PES), polyetheretherketone (PEEK), polyphthalamide.

The heating layer may include a conductive layer and an insulating protective layer. The conductive layer may include a metal oxide material. Conventionally, a carbon-based material (e.g., CNT, graphene) is used for a planar heating element and cannot be employed as a high-temperature planar heating element since such material is decomposed to carbon dioxide ($CO_2$) at a temperature above 350 degrees. Meanwhile, the conductive layer made of a metal oxide material does not suffer degradation in physical properties even when heated up to a high temperature of 500 degrees or greater. The conductive layer may include an electrode layer for applying power. The insulating protective layer is configured to protect the conductive layer from external impact.

The current limiting device (165) is configured to apply power to the heating layer and control the applied power. The current limiting device (165) includes a high temperature shut-off switch to cut off the voltage being fed from the first inverter (150) to the heating unit (164) in the case in which the heat generated from the heat generating unit (164) rises above a predetermined range of transition temperature, and to feed the voltage to the heating unit (164) from the first inverter (150) in the case in which the heat generated from the heat generating unit (164) decreases below the predetermined range of transition temperature.

The high temperature shut-off switch may include a predetermined insulating material, for example, $VO_2$ (vanadium dioxide), which rapidly changes its insulating characteristic (non-conductive characteristic) to a metallic characteristic at a predetermined temperature or in a condition corresponding to an electric field. When the temperature of $VO_2$, which is an insulator, increases, at room temperature, a level of resistance rapidly decreases by one hundred thousandth at approximately 67 degrees. The high temperature shut-off switch may have resistance levels different depending on temperature. Specifically, the high temperature shut-off switch has resistance equal to a level of 1 M Ohm at 30 degrees. In the temperature range between 30 degrees and 70 degrees, the resistance level gradually decreases as the temperature rises. In the temperature range between 70 degrees and 80 degrees, the resistance level rapidly increases below approximately 100 Ohm.

The air compressing tank (166) is configured to compress air used for discharging outwardly the water stored in the water chamber (1611) of the steam generator (161) and the water stored in the water tank (162), and store the compressed air. The compressed air feeding pump (167) is configured to feed the compressed air stored in the air compressing tank (166) to the water chamber (1611) of the steam generator (161) and the water tank (162).

Referring to FIG. 1, the cleaner (170) is operated by the AC voltage outputted from the first inverter (150), and is configured to clean an interior and an exterior of the automobile. The polisher (180) is operated by the AC voltage outputted from the first inverter (150), and is configured to clean a bonnet and seats of the automobile. The automobile including the steam washer mounted thereon according to an exemplary embodiment of the present disclosure may include a polish mounted thereon.

Figure 3:
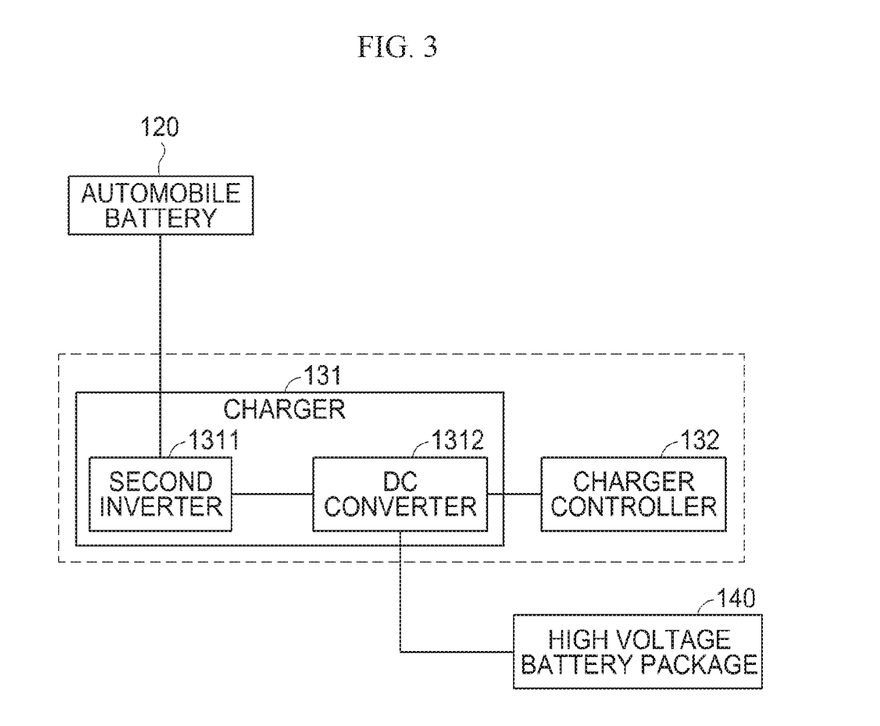
FIG. 3 is a block diagram illustrating an overall structure of a charger according to an exemplary embodiment of the present disclosure.
Figure 4:
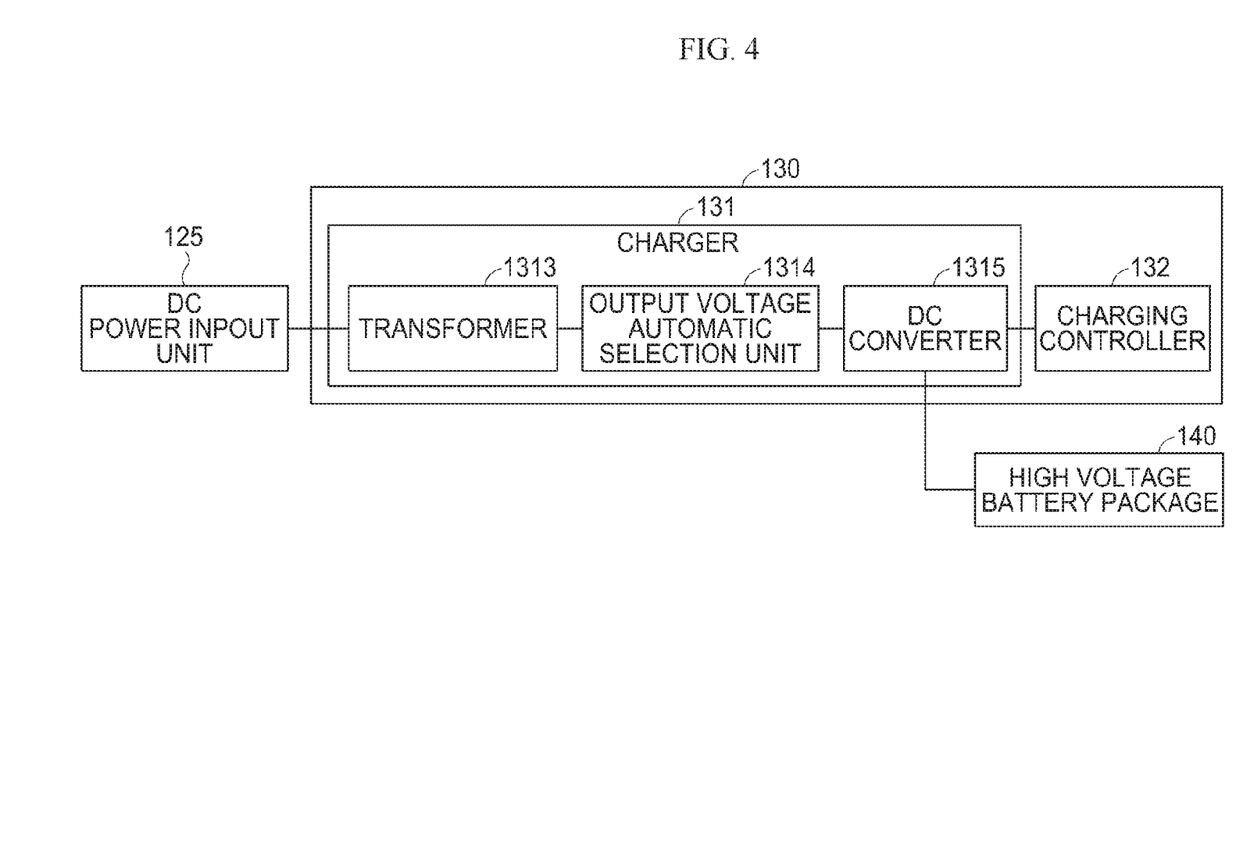
FIG. 4 is another block diagram illustrating an overall structure of the charger according to an exemplary embodiment of the present disclosure.

FIG. 3 is a block diagram illustrating an overall structure of a charger according to an exemplary embodiment of the present disclosure. FIG. 4 is another block diagram illustrating an overall structure of the charger according to an exemplary embodiment of the present disclosure.

Referring to FIG. 3, the charger (131) includes a second inverter (1311) to convert a voltage supplied from the automobile battery (120) to 220 V AC, and a DC converter (1312) to convert the 220 V AC outputted from the second inverter (1311) to a DC power for charging the high-voltage battery package (140).

Referring to FIG. 4, the charger (131) includes a transformer (1313) to convert 100 V AC or 200 V AC to multiple levels of decreased AC voltages and output the voltages, an output voltage automatic selection unit (1314) including an electronic contactor mounted on output lines to control ON/OFF based on an output control signal, wherein the converted multiple voltages (e.g., 6 V, 12 V, 24 V) are outputted through the output lines differently based on an operation of the transformer (1313), respectively, and a DC converter (1315) to convert an AC voltage outputted from the output voltage automatic selection unit (1314) to a DC power for charging the high-voltage battery package (140).

Figure 5:
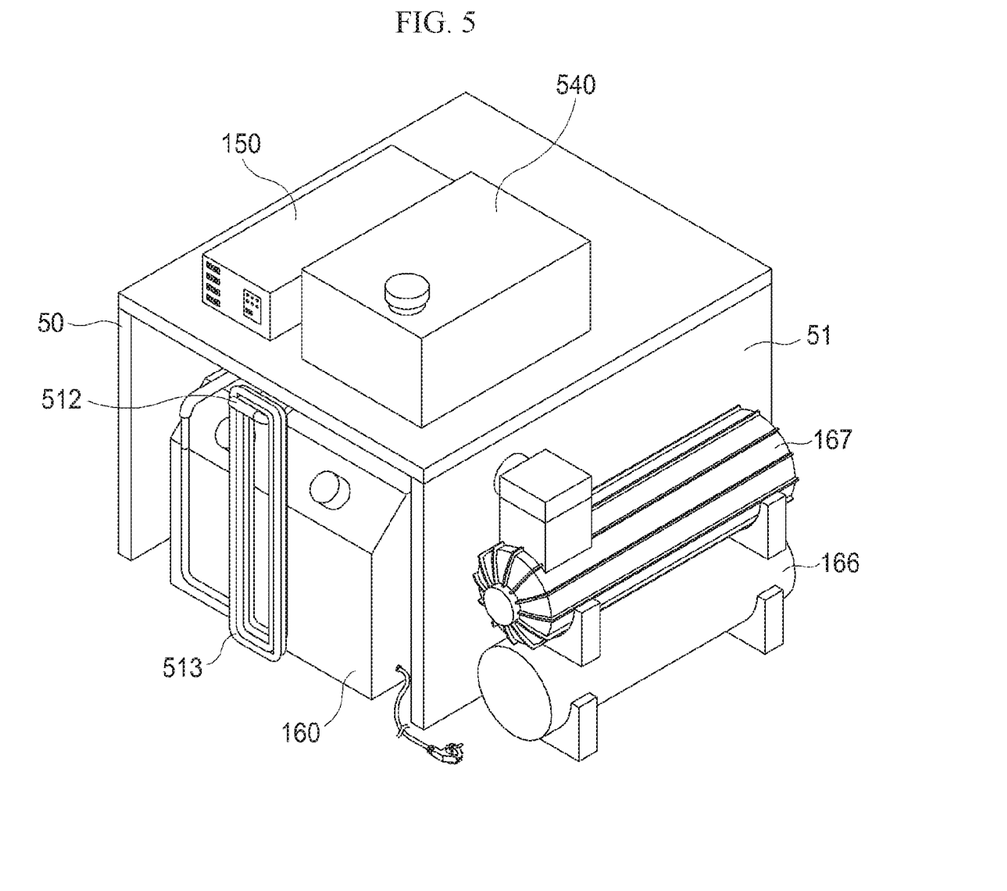
FIG. 5 is an exemplary view illustrating an internal structure of the automobile including a steam washer mounted thereon according to an exemplary embodiment of the present disclosure.
Figure 6:
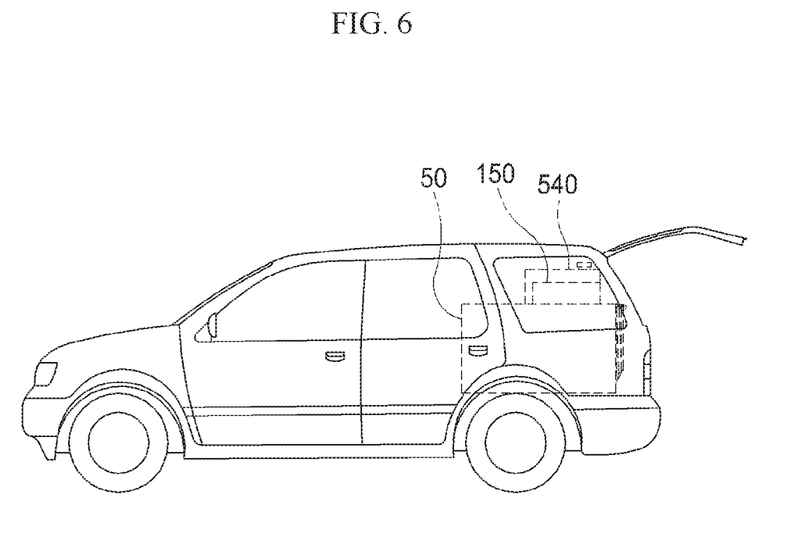
FIG. 6 is an exemplary view illustrating a state in which the steam washer according to an exemplary embodiment of the present disclosure is mounted on the automobile.

Referring to FIGS. 5 and 6, the automobile including the steam washer mounted thereon according to an exemplary embodiment of the present disclosure includes a support (51) to support an oil container (540) for storing oil fed as a combustion source to a combustor above an accommodation space for accommodating the steam washer (160) and the first inverter (150) to be mounted thereon, and a frame (50) including a hanger (512) to hang and secure a steam spray nozzle (513) connected to the steam generator.

The air compressing tank (166) and the compressed air feeding pump (167) are fixedly provided at a side of the support (51) connected to the frame (50). The arrangement of the respective parts may vary depending on the interior conditions of the automobile.

The automobile including the steam washer mounted thereon according to an exemplary embodiment of the present disclosure may be a small automobile and widely used as a cleaning service car. The steam washer may be secured within the automobile and through the steam spray nozzle (513), may be used to wash automobiles or building walls, etc. The steam sprayed through the steam spray nozzle (513) is considerable hot and may be used safely by those skilled.

Figure 7:
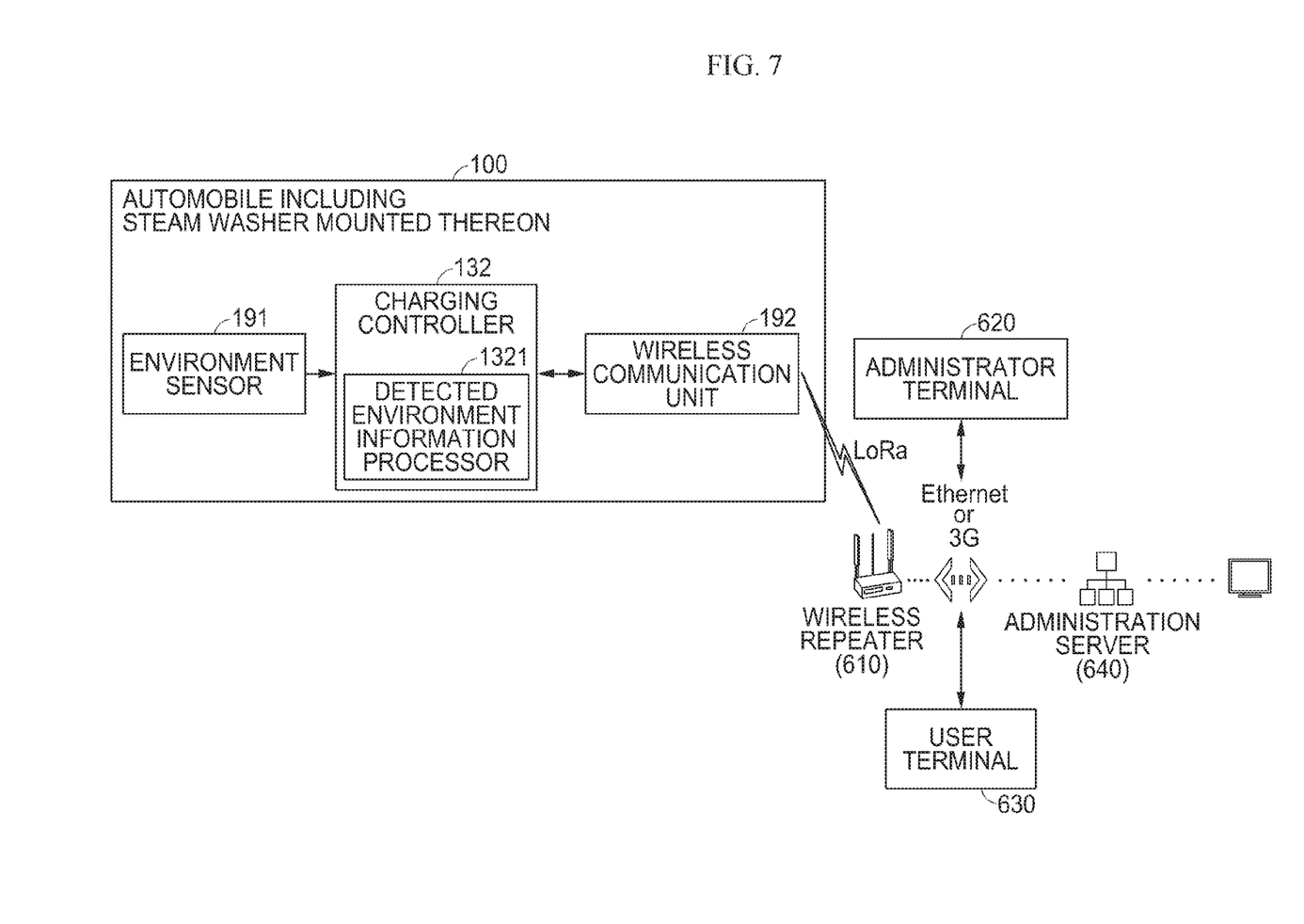
FIG. 7 is an exemplary view illustrating a system for transmitting, to an external device, information on the detected environment of the automobile including the steam washer mounted thereon according to an exemplary embodiment of the present disclosure.

Referring to FIG. 7, the automobile including the steam washer mounted thereon according to an exemplary embodiment of the present disclosure includes an environment sensor (191), a wireless communication unit (192) and a detected environment information processor (1321).

The environment sensor (191) is configured to detect information on an interior environment of the automobile including the steam washer mounted thereon. The environment sensor (191) may include a pressure sensor to detect a pressure of the water chamber of the steam generator, a temperature sensor to measure temperature, and a water level sensor to detect a water level of the water tank.

The wireless communication unit (192) includes a LoRa communication module to perform wireless communication with a wireless repeater (610) according to a LoRa communication protocol the data detected from the environment sensor (191).

The LoRa communication technology has a relatively longer range (up to 21 km within visible distance) than other wireless protocols and does not require several receivers and APs, thereby reducing infrastructure costs, and provides a higher expandability and cost efficiency for embedded applications than the 3/4G cellular network.

Specifically, the wireless communication unit (192) may perform short-range wireless communicate with a user terminal (630) according to Bluetooth, ZigBee, infrared communication (IrDA), Wi-Fi communication protocols.

The detected environment information processor (1321) is configured to transmit the detected environment information inputted from the environment sensor (191) to an external device via the wireless communication unit. The detected environment information processor (1321) may be provided in the charging controller (132). The detected environment information processor (1321) may use open source hardware, such as Raspberry Pi, Arduino, ARTIK, Beagle Board, and Intel Galileo.

Accordingly, an administrator terminal (620) and an administration server (640) store and remotely monitor data on an operational status of the automobile (100) including the steam washer mounted thereon.

Although exemplary embodiments of the present disclosure have been shown and described with reference to the accompanied drawings to enable one of ordinary skill in the art to readily understand and reproduce the present disclosure, the present disclosure is not limited to the described embodiments. Instead, it would be appreciated by one of ordinary skill in the art that changes may be made to these embodiments without departing from the principles and spirit of the invention, the scope of which is defined by the claims and their equivalents.

The invention claimed is:

1. An automobile including a steam washer mounted thereon, the automobile comprising:
an automobile battery charged by a voltage generated from a generator operated by an automobile engine;
a battery package mounted on the automobile for high-voltage charging and discharging;
a charging device including a charger for charging the battery package by using power being supplied and a charging controller for controlling the charging of the charger;
a first inverter to convert a direct current (DC) voltage outputted from the battery package to an alternating current (AC) voltage;
a steam washer operated by the AC voltage outputted from the first inverter, the steam washer comprising: a combustion chamber including a water chamber and a combustion chamber including a combustor for heating the water stored in the water chamber; a steam generator including a steam discharger for discharging the steam heated by the combustor; a water tank for storing water fed into the steam generator; and a body including the water tank and the steam generator;
a heating unit provided in the body of the steam washer and operated by the AC voltage outputted from the first inverter;
an air compressing tank for discharging, outwardly by an air pressure, the water stored in the water chamber of the steam generator and a compressed air feeding pump for feeding the compressed air stored in the air compressing tank to the water chamber of the steam generator and the water tank; and
a frame including an accommodation space for accommodating the steam washer, a support for supporting the air compressing tank and the compressed air feeding pump to be mounted on the accommodation space, and a hanger for hanging and securing a steam spray nozzle connected to the steam generator,
wherein the charger of the charging device comprises:
a second inverter is configured to convert the voltage received from the automobile battery to 220 V AC;
a first DC converter is configured to convert the 220 V AC outputted from the second inverter to a DC power for charging the battery package;
a transformer is configured to convert 110 V AC or the 220 V AC to multiple levels of decreased AC voltages and output the voltages;
an output voltage automatic selection unit including an electronic contactor mounted on output lines to control ON/OFF based on an output control signal, wherein the converted multiple voltages (6 V, 12 V, 24 V) are outputted through the output lines differently based on an operation of the transformer, respectively; and a second DC converter is configured to convert the AC voltage outputted from the output voltage automatic selection unit to a DC power for charging the battery package.

2. The automobile according to claim 1, further comprising a current limiting device including a high temperature shut-off switch to cut off the voltage fed from the first inverter to the heating unit in the case in which the heat generated from the heating unit rises above a predetermined range of transition temperature, and to feed the voltage from the first inverter to the heating unit in the case in which the heat generated from the heating unit decreases below the predetermined range of transition temperature.

3. The automobile according to claim 1, further comprising:
- a cleaner operated by the AC voltage outputted from the first inverter and used to clean an interior and an exterior of the automobile; and
- an automobile polisher operated by the AC voltage outputted from the first inverter.

4. The automobile according to claim 1, further comprising:
- an environment sensor to detect information on an interior environment of the automobile including the steam washer mounted thereon;
- a wireless communication unit to transmit and receive data on an interior temperature of the steam washer to and from the environment sensor; and
- a detected environment information processor to transmit the detected environment information inputted from the environment sensor to an external device via the wireless communication unit.

\* \* \* \* \*